United States Patent [19]
Sherman

[11] Patent Number: 5,150,069
[45] Date of Patent: Sep. 22, 1992

[54] WAVEFORM TRACKING CLIPPER CIRCUIT

[75] Inventor: James D. Sherman, Los Angeles, Calif.

[73] Assignee: Hughes Aircraft Company, Los Angeles, Calif.

[21] Appl. No.: 505,750

[22] Filed: Apr. 6, 1990

[51] Int. Cl.$^5$ .............................................. H03K 5/08
[52] U.S. Cl. ...................................... 328/171; 73/664; 307/549; 307/555; 307/557
[58] Field of Search .............. 307/542, 540, 544, 549, 307/551, 552, 555, 557, 559, 561, 565; 328/168, 169, 171, 172, 173; 73/664

[56] References Cited

U.S. PATENT DOCUMENTS

| | | | |
|---|---|---|---|
| 3,311,837 | 3/1967 | Moreines | 328/171 |
| 3,541,459 | 11/1970 | Webb | 307/542 |
| 3,654,804 | 4/1972 | Helmuth . | |
| 3,898,573 | 8/1975 | Sherman | 328/171 |
| 3,916,330 | 10/1975 | Weissman | 328/171 |
| 4,055,842 | 10/1977 | Yakshin et al. . | |
| 4,344,128 | 8/1982 | Frye . | |
| 4,479,094 | 10/1984 | Harris . | |
| 4,577,155 | 3/1986 | Kobayashi et al. . | |

FOREIGN PATENT DOCUMENTS 2015839 9/1979 United Kingdom .

OTHER PUBLICATIONS

Murakami, Patent Abstracts of Japan, vol. 11, No. 390 (E-567) (2837), (Dec. 19, 1987).

Primary Examiner—John Zazworsky
Attorney, Agent, or Firm—M. E. Lachman; W. J. Streeter; W. K. Denson-Low

[57] ABSTRACT

A waveform tracking clipper circuit for limiting the instantaneous amplitude of a processed vibration test signal at the input to a shaker amplifier to the instantaneous amplitude of an unprocessed vibration test signal, the unprocessed vibration test signal having been processed to develop the processed vibration test signal. Included is clamper circuitry connected to the input of the amplifier. Numerous variations are disclosed, including the use of precision rectifiers and a variety of redundancy configurations to guard against the potentially-devastating consequences of a component failure or control misadjustment.

18 Claims, 10 Drawing Sheets

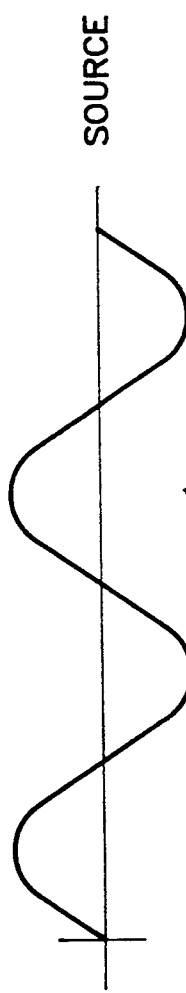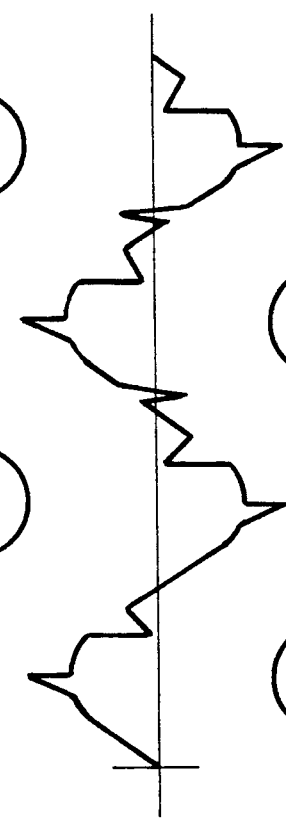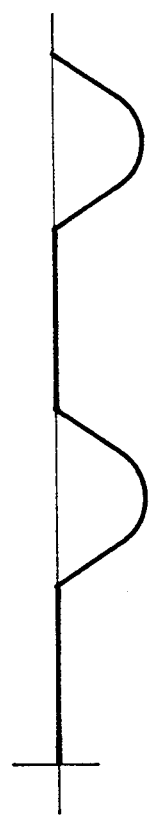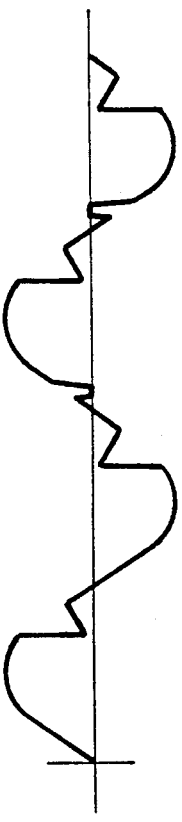
Fig 3a. SOURCE
Fig 3b. PROCESSOR OUTPUT
Fig 3c. POSITIVE CLAMPER VOLTAGE LEVEL
Fig 3d. NEGATIVE CLAMPER VOLTAGE LEVEL
Fig 3e. AMPLIFIER INPUT

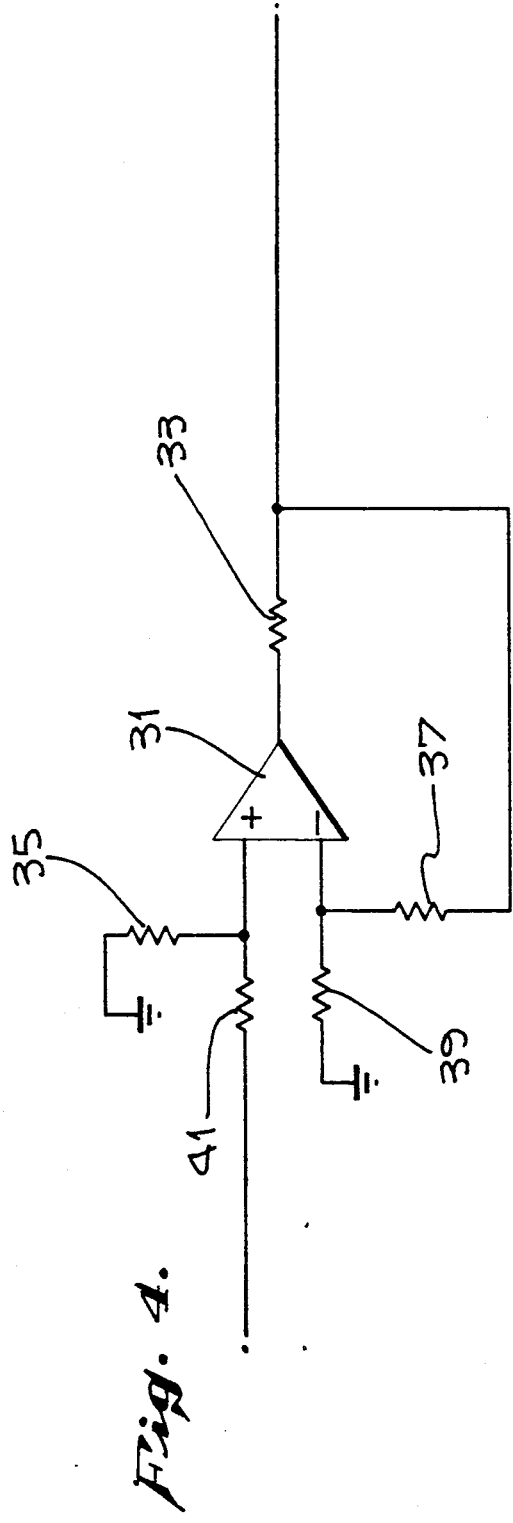
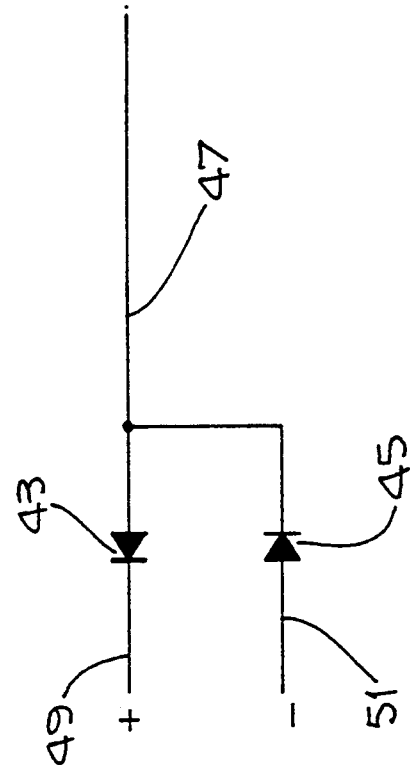
Fig. 4.
Fig. 5.

WAVEFORM TRACKING CLIPPER CIRCUIT

BACKGROUND OF THE INVENTION

1. Field of the Invention

This invention relates to vibration test equipment and, more specifically, to the circuitry which is used to develop the vibration test signal used in such equipment.

2. Description of Related Art

There is a growing need in a variety of industries for vibration test equipment. Generally, this equipment consists of a shaker platform which is driven by an amplified vibration test signal. Typically, the vibration test signal is initially generated as a sine wave or random noise. This initial signal is then processed by an operator-controlled console. The processed vibration test signal is delivered to the shaker amplifier, the output of which is delivered to the shaker platform.

Because of equipment failure or operator error, however, a vibration test signal is occasionally delivered to the shaker platform having a magnitude far beyond what was originally intended. This sometimes causes destruction of the equipment which is being tested. Depending upon the value of this equipment, the losses can be quite substantial.

SUMMARY OF THE INVENTION

It is a primary object of the present invention to obviate these as well as other problems in the prior art.

It is a further object of the present invention to provide circuitry which will prevent a shaker platform from vibrating at magnitudes significantly in excess of the desired amount, notwithstanding a failure in the signal processing or pre-amplifier circuitry, or a mistake made by the operator who is working the control console.

It is a still further object of the present invention to achieve these results using critical components which are passive in nature and even in the face of failures in the protective circuitry which Applicant has designed.

These as well as other objects, features and benefits of the present invention are achieved through the use of unique waveform tracking clipper circuitry.

In one embodiment, the pre-processed vibration test signal is processed by splitting and clamping circuitry. The output signal from this circuitry is used to clamp the input to the shaker amplifier so that its magnitude does not substantially exceed the instantaneous amplitude of the pre-processed test signal. Through the use of appropriate gain-control circuitry, the clamping amplitude can be controlled so that clamping does not occur until the processed signal exceeds the pre-processed signal by a pre-determined amount.

In one preferred embodiment, the splitting circuitry divides the pre-processed vibration test signal into its positive and negative components. The splitter circuitry may advantageously include a positive and negative precision rectifier. The input to the shaker amplifier is then clamped by the clamping circuitry so that it cannot substantially exceed the instantaneous amplitude of either of these components. Oppositely oriented diodes may advantageously be used in the clamping circuitry.

To facilitate clamping of the input signal to the amplifier, a limiting circuit can be positioned between the processed test signal and the amplifier input. Typically, current limiting is used.

In a second embodiment—suited to shaker systems which use complementary signals to drive a push-pull final power amplifier—a simulator is connected to the pre-processed test signal. The simulator develops a pair of complementary signals that are substantially the same as the complementary signals delivered to the push-pull shaker amplifier inputs in the absence of a malfunction or misadjustment. These simulated complementary signals are then processed to develop a first output which substantially tracks only the active portion of the first simulated signal and a second output which substantially tracks only the active portion of the second simulated signal. ("Active portion" refers to that portion which corresponds with the portion of the complementary input that activates and controls the push-pull amplifier.) The complementary inputs to the amplifier are then clamped by connecting them, respectively, to these first and second outputs, preferably using diodes.

In a still further embodiment of the present invention, redundancy circuitry is provided to insure that various component failures will not nullify the protective benefits of the subject invention or, worse, cause damaging excursions to be delivered to the shaker platform. Such redundancy circuitry includes the use of parallelled splitters and associated clampers, clamping diodes connected in series, and/or a parrot signal source synchronized to the main signal source.

Although described with reference to a shaker system, this invention is applicable to a broad variety of fields, including the high-powered sound system art, the medical field (including digitally-created level signals used in radiation therapy) and the servo field.

These as well as further features, objects and advantages of the present invention will now become apparent from consideration of the following drawings and detailed description.

BRIEF DESCRIPTION OF THE DRAWINGS

FIGS. 3 (a)–(e) are pictorial illustrations of selected signals typically present in the shaker system in FIG. 2.

FIG. 4 is a schematic diagram of one embodiment of the limiter circuit shown in FIG. 2.

FIG. 5 is a schematic diagram of one embodiment of the clamper circuits shown in FIG. 2.

DESCRIPTION OF THE PREFERRED EMBODIMENTS

Figure 1:
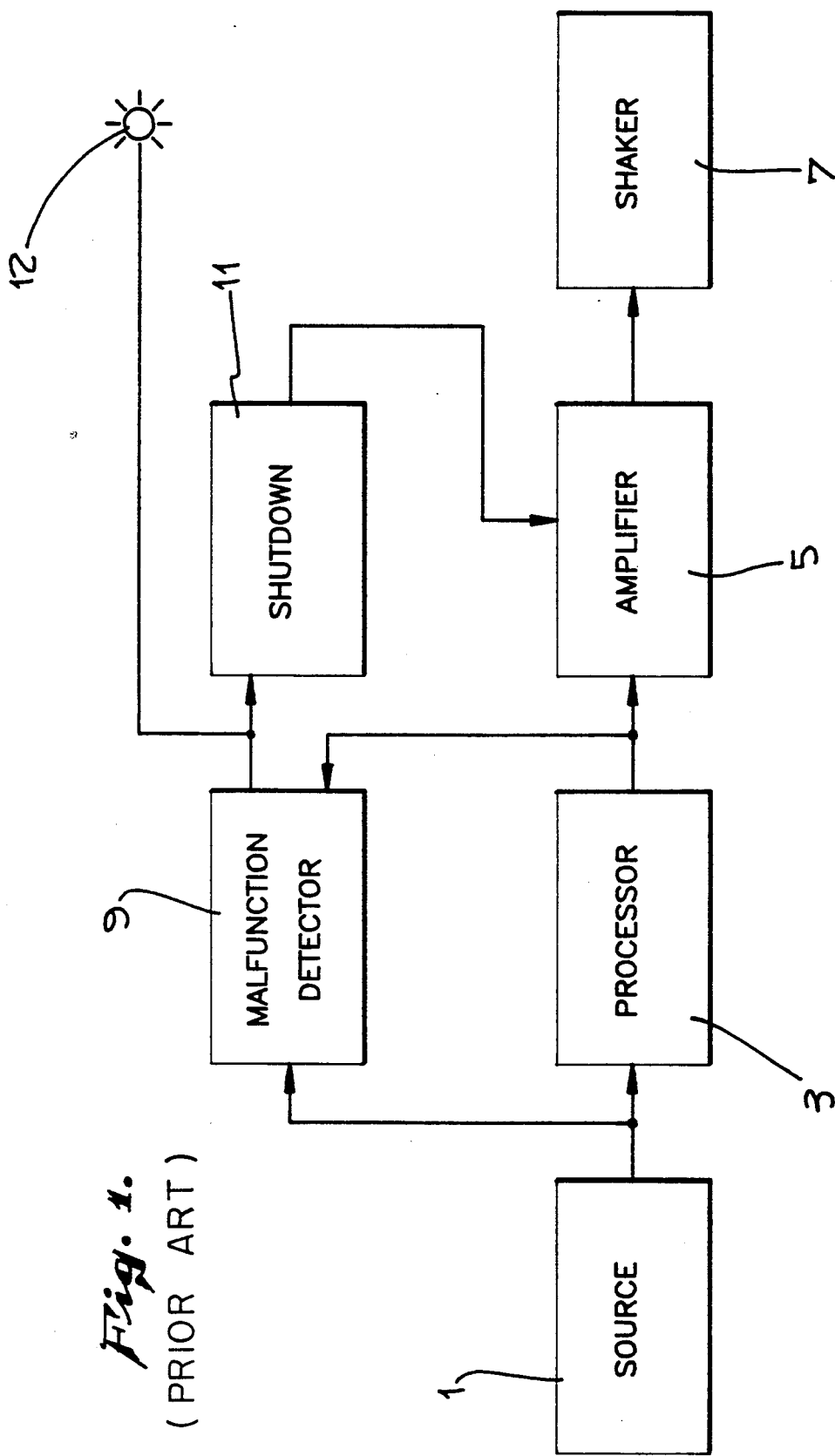
FIG. 1 is a block diagram illustrating the basic components of a typical prior art shaker system.

FIG. 1 is a block diagram illustrating the basic components of a typical prior art shaker system.

As shown in FIG. 1, such a system typically consists of a source 1 for generating the desired and unprocessed vibration test signal, a processor 3 for modifying, refining or otherwise processing the vibration test signal, an amplifier 5 for amplifying the processed vibration test signal, and a shaker 7 for transforming the processed and amplified vibration test signal into mechanical motion.

Typically, the source 1 is a digital computer whose output is processed by a digital-to-analog converter. Other techniques of generating the vibration test signal, of course, could also be used, including analog techniques.

The form of the vibration test signal generated by the source 1, to a large degree, will be determined by the nature of the test which is to be performed. Typically, it is either a sine wave or random noise.

The processor 3 typically includes an operator-controlled console. By setting and adjusting various controls, the operator can modify, refine or otherwise alter the pre-processed vibration test signal to satisfy the requirements of the test which is to be performed. Generally, however, the processor 3 does not cause a significant increase in the absolute value of the instantaneous amplitude of the pre-processed test signal generated by the source 1. The processor 3 may include pre-amplifiers and compensation circuitry.

The amplifier 5 can take a broad variety of forms. Typically, it faithfully replicates the signal delivered from the processor 3 and increases its power to drive the shaker 7 in a fashion which will also faithfully replicate the processed signal generated by the processor 3. Although not shown in FIG. 1, the amplifier 5 may well be proceeded by several stages of pre-amplification, including appropriate compensation circuitry.

The shaker 7 is typically a steel table driven by a speaker-like driving coil. Of course, it is anticipated that other types of electrical-to-mechanical devices could also be used.

In the past, a malfunction detector 9 and a shut-down circuit 11 have advantageously been employed to offer some degree of protection against component failure in the processor 3 or operator mistakes in its usage. The malfunction detector 9 would include circuitry which compares the input and output to the processor 3 and generates a malfunction signal when the absolute value of the output significantly exceeds the absolute value of the input. If desired, the output of the malfunction detector can be connected to a warning indicator 12 and/or a shut-down circuit 11 which delivers a shutdown signal to the amplifier 5.

Unfortunately, an operator's response to the warning indicator 12 is often not quick enough to avoid disaster. Although the shut-down circuit 11 may help to prevent damage, it also will terminate the test, which may not be desirable.

Figure 2:
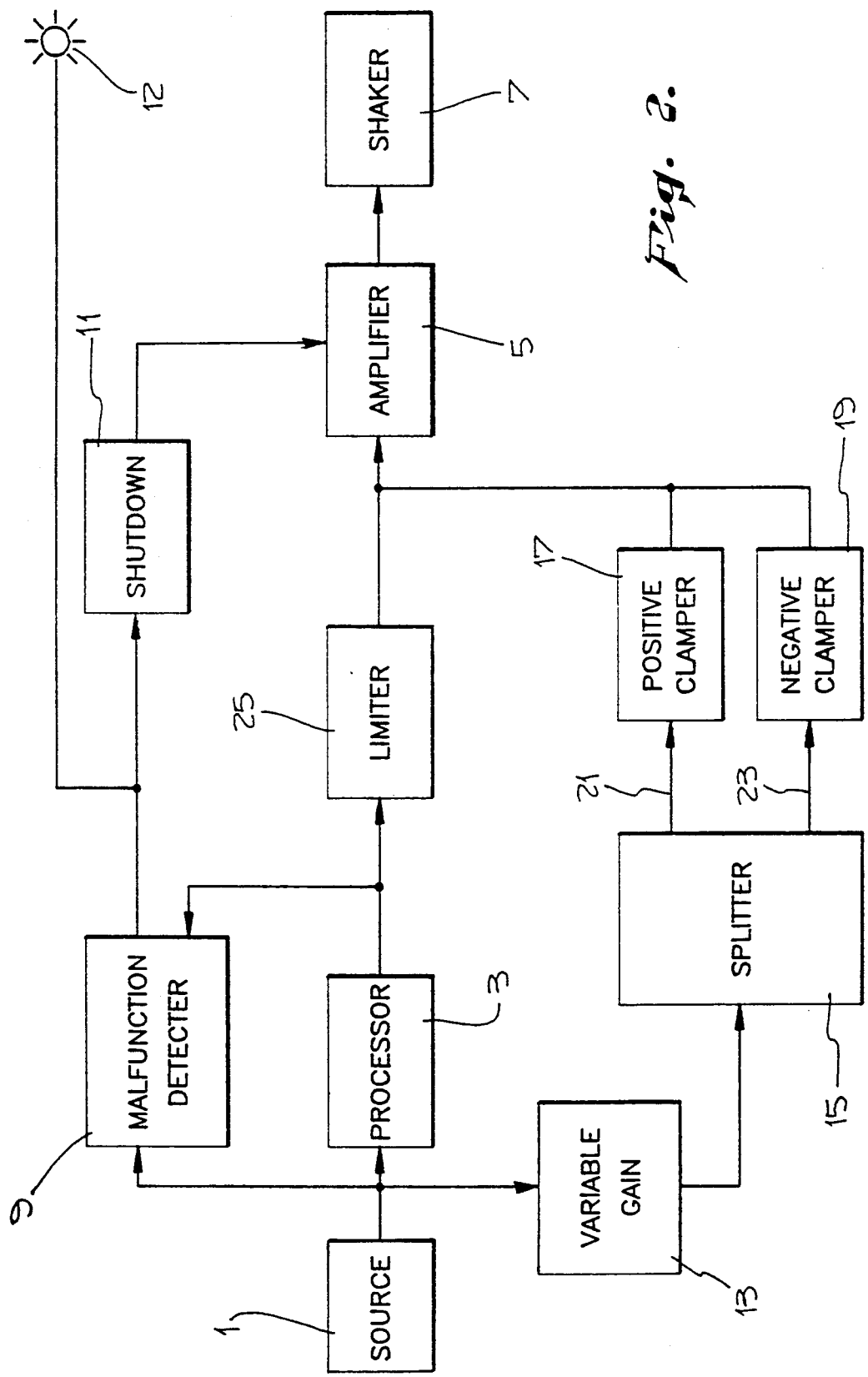
FIG. 2 is a block diagram illustrating the basic components of a shaker system made in accordance with one embodiment of the subject invention.

FIG. 2 is a block diagram illustrating the basic components of a shaker system made in accordance with one embodiment of the present invention.

As shown in FIG. 2, this shaker system includes the basic components of the prior art shaker system shown in FIG. 1, namely the source 1, the processor 3, the amplifier 5 and the shaker 7. It may similarly include, if desired, the malfunction detector 9, the warning indicator 12, and/or the shut-down circuit 11.

Unlike the shaker system shown in FIG. 1, however, the shaker system shown in FIG. 2 further includes an optional variable gain circuit 13, a splitter circuit 15, a positive clamper 17, and a negative clamper 19.

The splitter circuit 15 typically splits the signal from the source 1 into a positive output 21 and a negative output 23. The positive output 21 tracks the positive portions of the signal from the source 1. Correspondingly, the negative output 23 tracks the negative portions of the signal from the source 1.

A positive clamper 17 is used to insure that the input to the amplifier 5 does not exceed the magnitude of the positive output 21 from the splitter 15. Similarly, a negative clamper 19 is used to insure that the input to the amplifier 5 is not less than the amplitude of the negative output 23 from the splitter 15.

A variable gain circuit 13 may optionally be connected between the signal from the source 1 and the splitter 15. Generally, the gain is set to a magnitude of slightly greater than one. This insures that the clampers 17 and 19 will not unnecessarily clamp the input to the amplifier 5 because of nonlinearities or other distortions in the system. If set to a gain substantially greater than one, the variable gain circuit 13 can also function to prevent clamping unless the absolute value of the input to the amplifier 5 exceeds the instantaneous value of the signal from the source 1 by a substantial amount, rather than by simply a slight amount. This could be useful, for example, in situations where the processor 3 is intentionally adjusted to increase the absolute value of the signal source 1.

The variable gain circuit 13 may also optionally include means to shift the phase of the signal from the source 1 to match any phase shift that takes place in the processor 3. Such phase-shifting-matching circuitry may be included in other portions of the system, if desired, as should be obvious to those skilled in the art.

The shaker system of FIG. 2 may also include a limiter 25. In a typical configuration, the limiter 25 would be a current limiter. It would be adjusted so as to allow passage of sufficient current to drive the amplifier 5 in the absence of a malfunction or misadjustment. At the same time, it would be set low enough such that the output of the processor 3 could not furnish current in excess of the amounts which the clampers 17 and 19 could sink in the event of a malfunction or misadjustment.

Although the limiter 25 is shown as a separate circuit in FIG. 2, it is, of course, to be understood that the output impedance of the processor 3 might be sufficiently high as to itself function as the limiter 25. Thus, it is intended that the limiter 25 encompass not only separate circuitry which may be added to an existing system, but existing circuitry which intrinsically functions to limit the current to the amplifier 5, thereby allowing the clampers 17 and 19 to function.

FIGS. 3 (a)-(e) are pictorial illustrations of selected signals typically present in the shaker system shown in FIG. 2. They serve to provide a visual picture of how the components shown in FIG. 2 interact to guard against damage caused by a malfunction or operator error.

FIG. 3(a) illustrates a typical signal which might be generated by the source 1. In this case, it is a sine wave. Other signal forms such as random noise, of course, are also contemplated.

FIG. 3(b) illustrates the signal coming from the output of the processor 3. The outwardly protruding spikes (both positive and negative) are caused by a malfunction or misadjustment. If they are not prevented from driving the shaker 7, they might well cause serious damage to the equipment under test. The inwardly going spikes (both positive and negative), on the other hand, do not exceed the absolute magnitude of the source signal. These inwardly going noise spikes are not likely to cause damage since they do not increase the absolute drive level. The wave tracking clipper does not act on these inwardly going noise spikes unless the spikes go inward enough to change polarity. Then they are clamped at zero by the opposite clamper as indicated in FIG. 3(e). As will now be seen, the subject invention, a preferred embodiment of which is shown in FIG. 2, achieves all of these results.

FIG. 3(c) shows the positive output 21 from the splitter 15. As can be seen from a comparison of FIG. 3(c) and FIG. 3(a), the positive output 21 from the splitter 15 simply and solely mirrors the positive portions of the signal from the source 1.

FIG. 3(d) shows the negative output 23 from the splitter 15. It similarly mirrors solely the negative portions of the signal from the source 1.

The positive clamper 17 prevents the input to the amplifier 5 from exceeding the positive output 21 from the splitter 15. Similarly, the negative clamper 19 prevents the input to the amplifier 5 from exceeding the negative output 23 from the splitter 15. The combined result at the input to the amplifier 5 is, therefore, the signal shown in FIG. 3(e). All outgoing excursions are clamped, while all in-going excursions are left alone, unless they go inward enough to change polarity, in which case they are clamped at zero.

FIG. 4 is a schematic diagram of one embodiment of circuitry which may advantageously be used for the limiter 25 (assuming that the output impedance of the processor 3 is such as to require an additional limiter). It includes an operational amplifier 31 configured with resistors 33, 35, 37, 39 and 41 in a classic current-limiting configuration. Numerous other types of current limiters can also be used, such as just a simple resistor, if desired.

FIG. 5 is a schematic diagram of one preferred embodiment of circuitry which can advantageously be used for the clampers 17 and 19 shown in FIG. 2. In this case, it is simply two diodes 43 and 45 connected in opposing relationship. The clamping side 47 of the diodes can simply be connected to the input to the amplifier 5. The other end 49 and 51 of each diode 43 and 45 would be connected, respectively, to the positive output 21 and the negative output 23 of the splitter 15.

Figure 6:
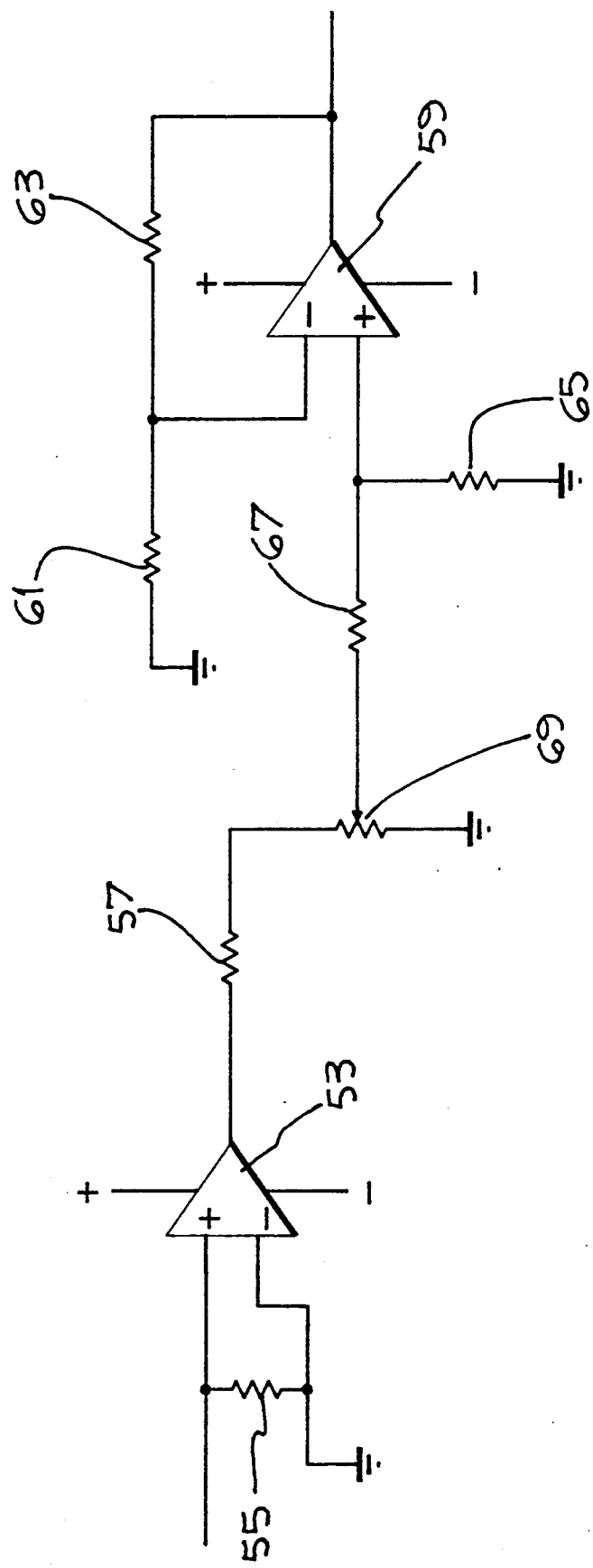
FIG. 6 is a schematic diagram of one embodiment of the gain circuit shown in FIG. 2.

FIG. is a schematic diagram of one preferred embodiment of the gain circuit 13 shown in FIG. 2. It includes an operational amplifier 53 connected with resistors 55 and 57 in an non-inverting buffer configuration, an operational amplifier 59 and resistors 61, 63, 65 and 67 connected in an non-inverting amplifier configuration, and a gain-adjusting potentiometer 69. With the proper selection of resistor values, the circuit shown in FIG. 6 will function to provide an overall uninverted gain at an adjustable level greater than 1. The selection of the resistors, of course, would be in accordance with well-known and established practices. Other types of controllable gain circuits, of course, could also be used. Indeed, the system could be made to function quite well with simply a fixed gain.

Figure 7:
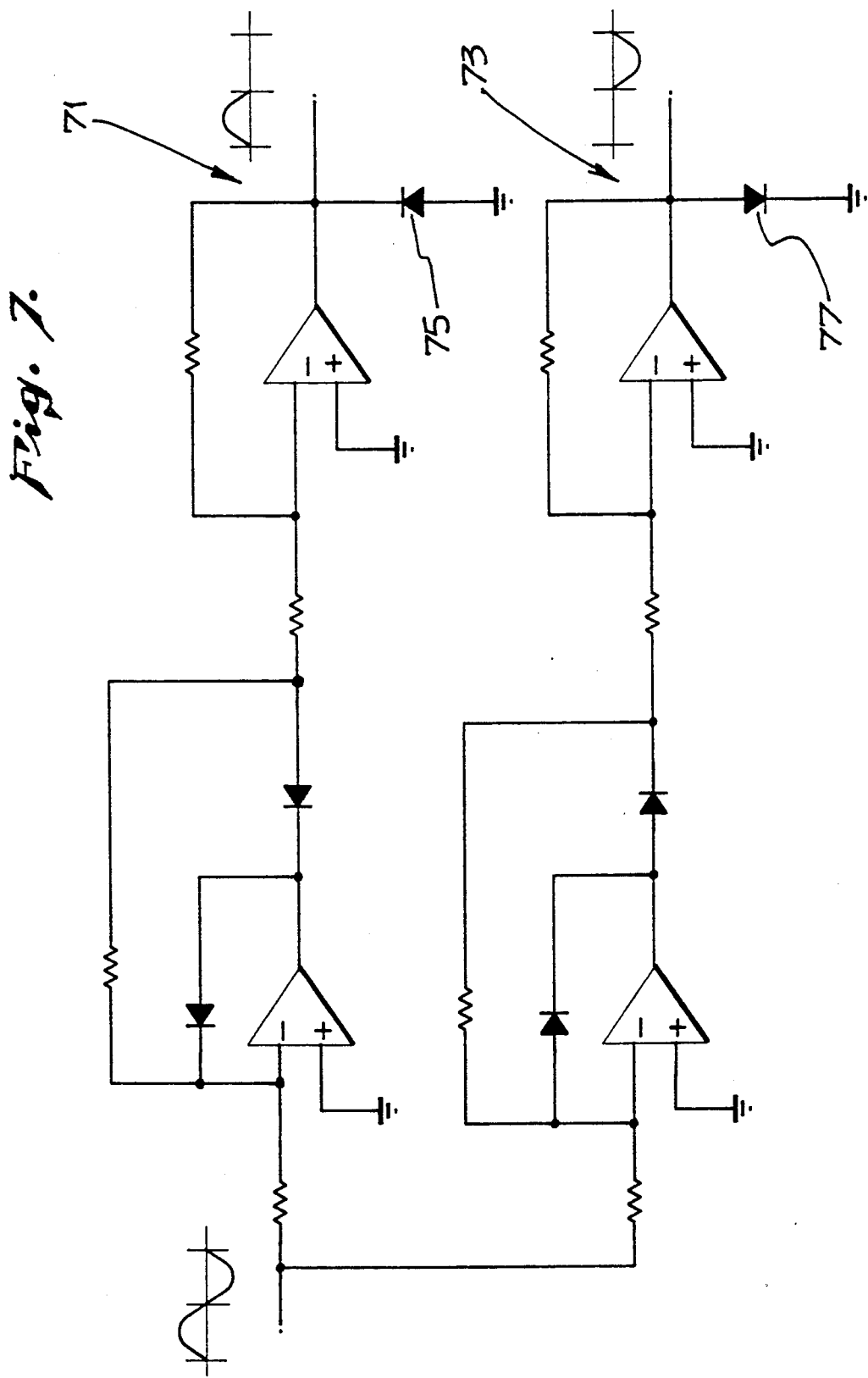
FIG. 7 is a schematic diagram of one embodiment of the splitter circuit shown in FIG. 2.

FIG. 7 is a schematic diagram of one embodiment of circuitry which can advantageously be used for the splitter 15. It essentially consists of positive precision rectifier 71 and a negative precision rectifier 73. As is well known in the art, a precision rectifier rectifies either the positive or negative half of an input signal without suffering the approximately 0.6 volt forward bias drop across the rectifying diode.

It should be noted that the splitter circuit shown in FIG. 7 additionally includes protection diodes 75 and 77. These protect against the potentially-catastrophic consequences of a component failure in the circuitry in FIG. 7 by insuring that the output of each precision rectifier cannot swing to a polarity opposite of its normal output.

It is to be understood that the amplifier 5 shown in FIG. 2 may well represent a final power amplifier, as opposed to a combined pre-amplifier and final amplifier. In other words, the subject invention contemplates that the clamping output of the positive clamper 17 and the negative clamper 19 may well be connected to the input of the final power amplifier stage, rather than at any preliminary amplifier stage. This would be advantageous because it would additionally protect against the potentially devastating consequences of a failure in one of the pre-amplifier stages. Since higher current levels are usually involved at the input to the final power amplifier stage, however, the current carrying capabilities of the positive clamper 17, the negative clamper 19, and the splitter 15 would have to be increased to match.

Frequently, the input stage to the final power amplifier is operated in a push-pull mode with two complementary drive inputs. Each input has an active phase during which it controls the amplifier's output. Generally, the active phases of the two inputs are complementary, with only slight overlap. The present invention may also be advantageously used to directly clamp these complementary inputs to prevent damaging excursions.

Figure 8:
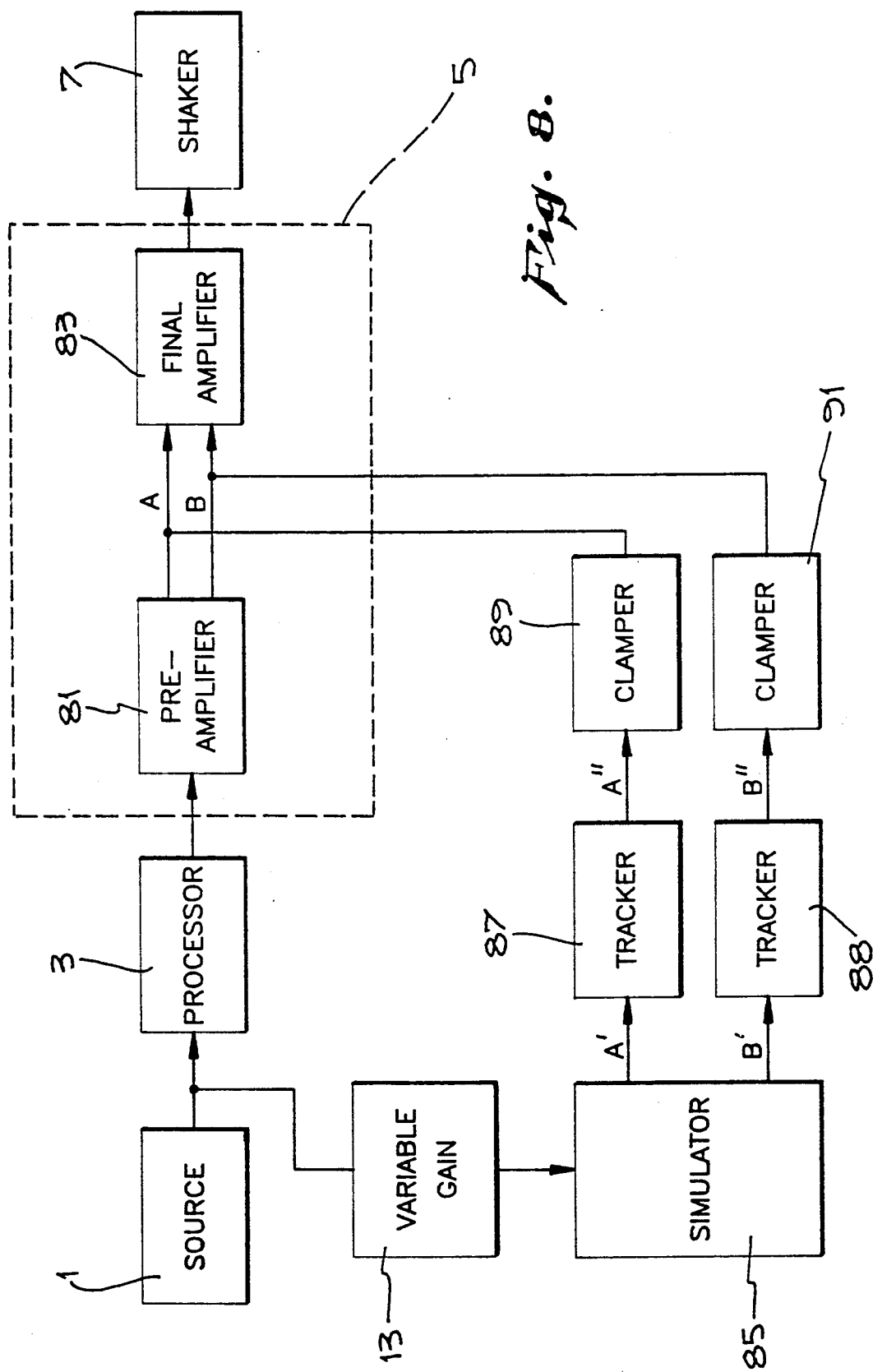
FIG. 8 is a block diagram illustrating the basic components of a shaker system made in accordance with a second embodiment of the present invention, adapted to a push-pull shaker amplifier having complementary inputs.

FIG. 8 is a block diagram illustrating the basic components of a shaker system made in accordance with the present invention which is adapted to clamp a push-pull shaker amplifier directly at its complementary inputs.

As shown in FIG. 8, the shaker system may typically include the source 1, the processor 3 and the shaker 7 illustrated and discussed above in connection with FIGS. 1 and 2. The amplifier 5 shown in FIGS. 1 and 2, however, is shown in FIG. 8 in more detail and, in particular, as consisting of a pre-amplifier 81 having complementary outputs A and B connected to a final amplifier 83.

If desired, the input signal to the pre-amplifier 81 may be directly clamped using the system shown in FIG. 2 without modification. However, added protection can be obtained by clamping the complementary A and B inputs to the final amplifier 83. This may be done instead of or in addition to clamping the input to the pre-amplifier.

A simulator circuit 85 is provided to assist in this effort. Its input is connected to the vibration test signal coming from the source 1 through, if desired, the variable gain circuit 13 (which, if included, would function just like the variable gain circuit 13 in FIG. 2). The simulation circuit 85 develops and delivers complementary outputs A' and B' which are substantially the same as the complementary outputs A and B, respectively, from the pre-amplifier 81, in the absence of any malfunction or misadjustment in the processor 3 or preamplifier 81.

Each of the complementary outputs A' and B' from the simulator 85 are processed by a tracker 87 and 88, respectively, to develop and deliver tracker outputs A" and B". Tracker output A" tracks the portion of output A' which corresponds with the active phase of A, while tracker output B" tracks the portion of the output B' which corresponds with the active phase of B.

A clamper circuit 89 is then connected between the output A" and the input A to the final amplifier 83, while a second clamper circuit 91 is connected between the output B" and the B input to the final amplifier 83. Just like the clampers 17 and 19 shown in FIG. 2, each clamper 89 and 91 serves to limit the magnitude of the complementary input signal to which it is connected so that it does not exceed the input to the clamper.

The trackers 87 and 99 and the first and second clampers 89 and 91 can be made of the same circuitry as is shown in FIGS. 7 and 5, respectively. The inputs of the precision rectifiers and the outputs of the diodes, of course, would not be tied together. Moreover, because both of the complementary drive input signals A and B usually only drive the final amplifier 83 during the positive (or negative) portion of their respective cycles, the precision rectifiers and diodes would not be oppositely polarized, as shown in FIGS. 7 and 5, but rather would be similarly polarized to both operate on the positive (or negative) portions of the complementary signal which they process.

Unlike the shaker system shown in FIG. 2, therefore, the shaker system shown in FIG. 8 develops two separate clamping signals, one for each of the two complementary inputs to the final amplifier.

The protective circuitry discussed above is essentially passive. It theoretically cannot apply any voltage to the input of the amplifier, but can only clamp or limit the magnitude of the voltage which is applied. Thus, this circuitry is conceptionally fail safe.

Further protection, however, can be realized by using redundancy in various critical portions of the system. A few examples of such redundancy will now be discussed.

Figure 9:
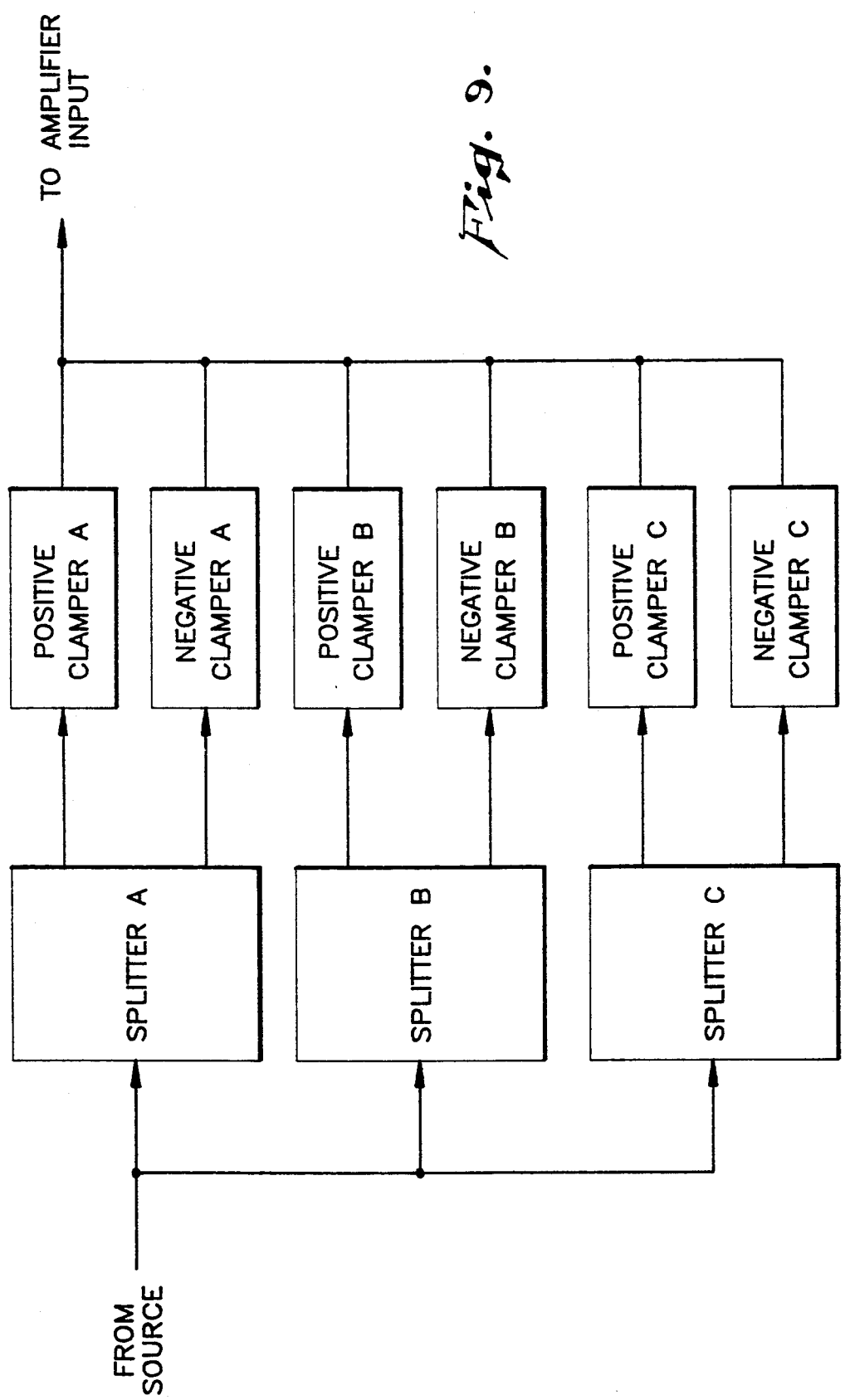
FIG. 9 is a block diagram illustrating one embodiment of a redundancy circuit which can advantageously be used in the splitter and clamper portion of the subject invention.

FIG. 9 is a block diagram of one redundancy circuit which can advantageously be used in the splitter and clamper portions of the subject invention. Rather than having a single splitter and associated positive and negative clamper, as shown in FIG. 2, a plurality of splitter and associated positive and negative clamper sets can be parallelled, as shown in FIG. 9.

By parallelling sets of splitter and clamper circuits, a failure in one set will not be able to cause an unacceptable excursion in the amplifier input because of the clamping effect of the remaining sets. Although three such sets are shown as being parallelled in FIG. 9, it is of course to be understood that any number greater than one could advantageously be used to achieve this redundancy function.

In such a system, the functioning sets must be able to sink any phantom current caused by a malfunctioning set to prevent a potentially-damaging signal from being delivered to the input of the amplifier. In order for this to occur, it is essential that no one malfunctioning set in the system be able to deliver an amount of current which is greater than can safely be sunk by the remaining sets in the system. Very careful and selective design of all system components is therefore essential.

Figure 10:
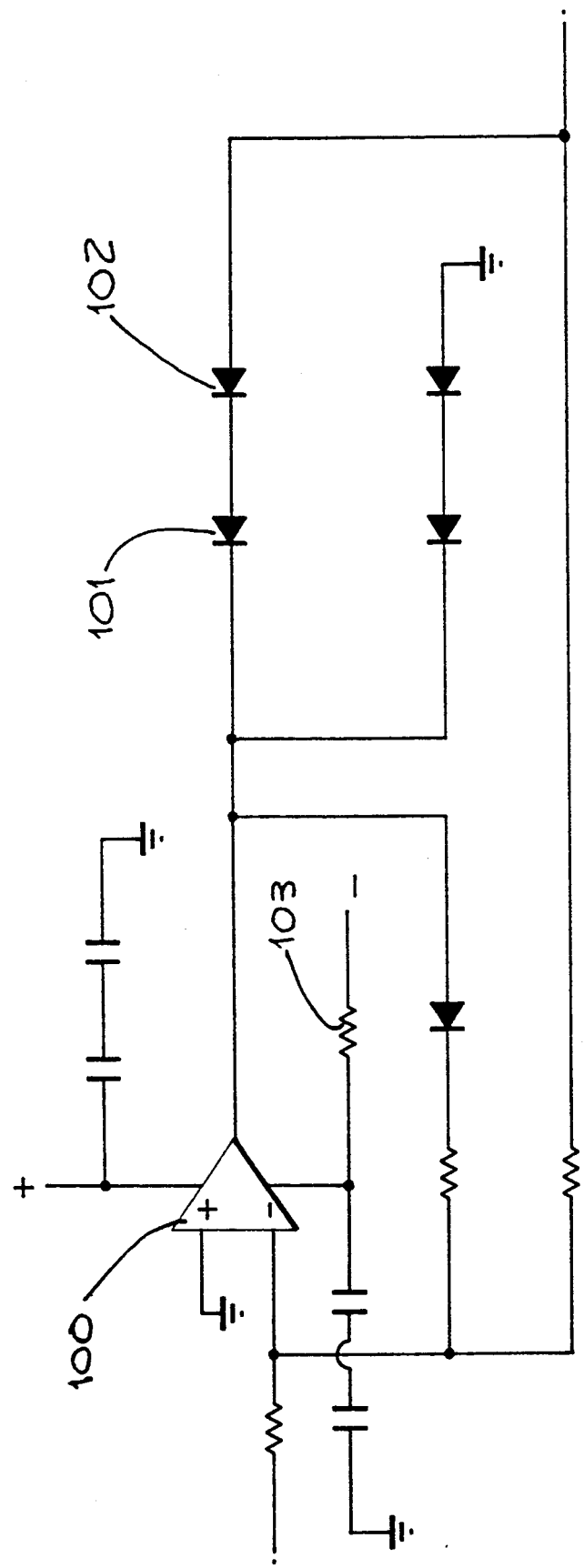
FIG. 10 is a schematic diagram of one embodiment of one of the clampers and a portion of one of the splitters shown in FIG. 9.

FIG. 10 is a schematic of a portion of one such careful and selective design. It shows the positive precision rectifier which may comprise half of each of the splitters shown in FIG. 9, together with the positive clamper associated therewith.

Instead of using a single diode for the clamper, however, two diodes 101 and 102 are connected in series. This redundancy protects against the potential catastrophic consequences of a short in one of the clamper diodes.

In addition, the negative voltage power input to an operational amplifier 100 (which functions as a component in the positive precision rectifier) is current-limited by a resistor 103. In this way, the amount of harmful negative current which could be delivered at the output of the circuit shown in FIG. 10 in the event of an internal short in the operational amplifier 100 would be limited by the resistor 103. In turn, this would limit the amount of current which the remaining functional sets of the redundancy circuits shown in FIG. 9 would have to sink in order to prevent the short from altering the input voltage to the shaker amplifier.

Six such circuits would be used to construct the system shown in FIG. 9. Three would be identical to the circuit shown in FIG. 10. The other three would also be identical, except that all of the diodes would be reversed and the resistor 103 would be inserted in the positive power supply lead, rather than in the negative.

Figure 11:
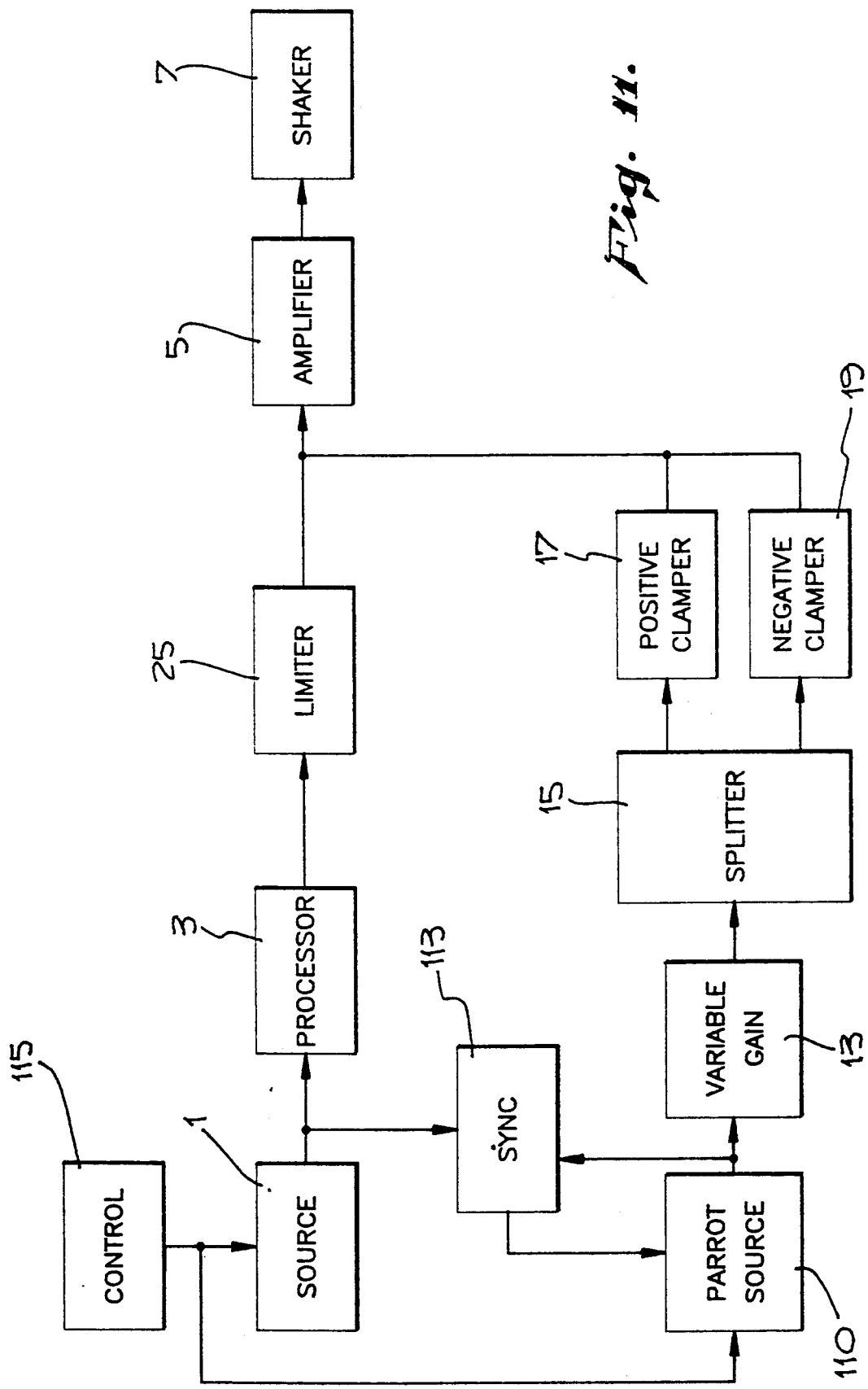
FIG. 11 is a block diagram illustrating a redundancy system using a parrot signal source.

FIG. 11 is a block diagram illustrating the basic components of a shaker system using a parrot signal supply source as another redundancy technique.

More specifically, the shaker system of FIG. 11 includes many of the same components as are shown in FIG. 2, namely the source 1, the processor 3, the amplifier 5, the shaker 7, the optional variable gain 13, the splitter 15, the positive clamper 17, the negative clamper 19, and the limiter 25. It additionally includes, however, a parrot source 110 and a sync circuit 113. (Although a control block 115 is also shown, the existence of a control block is implicit in FIG. 2.)

Essentially, the parrot source 110 is designed to generate a signal substantially identical to the signal which is generated by the original source 1. The control 115 simply illustrates that whatever control is used to set the signal from the source 1 is also used to set the signal from the parrot source 110. This could be as simple as an operator setting switches or, perhaps, a computer software program. The sync circuit 113 simply insures that the signal generated by the parrot source 110 is in synchronization with the signal generated by the source 1.

The shaker system shown in FIG. 11 adds protection against a malfunction in the source 1. This additional protection flows from the redundancy effect of the parrot source 110.

Although discussed in the context of shaker systems, the present invention also has broad application to a variety of other fields. For example, it might advantageously be used in a high-powered sound system to protect against failures in the amplifying circuitry. It might also be used in the medical field to guard against the generation of excessive signals that might endanger the patient. In radiation therapy, for example, the radiation level is often established by digital computers or other electronic circuitry. The subject invention could be appropriately driven and connected to clamp this radiation level signal. Similarly, the subject invention could advantageously be configured to guard against damaging excursions in servo systems.

Numerous other variations of the present invention should also now appear obvious to those of ordinary skill in the art. For example, although analog circuitry has, for the most part, been discussed herein, digital circuitry might well be used instead. Moreover, various combinations of the clamping and redundancy techniques might be used simultaneously to enhance the degree of protection. In short, the present invention is intended to be and is limited solely by the following claims.

What is claimed is:

1. A solid state waveform tracking clipper circuit for preventing the instantaneous amplitude of a processed vibration test signal at the input to a shaker amplifier form substantially exceeding the instantaneous amplitude of an unprocessed vibration test signal, the unprocessed vibration test signal having been processed to develop the vibration test signal, comprising:
    a. limiting means connected between the processed signal and the input of the amplifier for limiting the processed signal at the input of the amplifier;
    b. solid state splitter means having an input connected to the unprocessed signal and having a first and second output, the first output for tracking a first portion of the unprocessed signal, the second output for tracking a second portion of the unprocessed signal;
    c. first clamping means connected to said first output and tot he input of the amplifier for clamping the input of the amplifier to the value of said first output; and
    d. second clamping means connected to said second output and tot he input of the amplifier for clamping the input to the amplifier to the value of said second output.

2. The waveform tracking clipper circuit of claim 1 wherein the unprocessed signal has positive and negative voltage portions and wherein said first output tracks the positive voltage portions of the unprocessed signal and wherein said second output tracks the negative voltage portions of the unprocessed signal.

3. The waveform tracking clipper circuit of claim 1 wherein each of said clamping means includes a diode.

4. The waveform tracking clipper circuit of claim 1 further including a gain circuit inserted between the unprocessed signal and the input to said splitter means, said gain being set to an amount greater than one.

5. The waveform tracking clipper circuit of claim 1 wherein said splitter means includes a positive precision rectifier and a negative precision rectifier, each of said rectifiers having an output, and wherein said first output tracks the positive portion of the unprocessed signal and said second output tracks the negative portion of the unprocessed signal.

6. The waveform tracking clipper circuit of claim 5 further including a clamping diode connected to the output of each precision rectifier to prevent a voltage excursion at each output having a polarity of opposite of what the precision rectifier should have.

7. The waveform tracking clipper circuit of claim 1 wherein said limiting means limits the processed signal by limiting the current which the signal can deliver to the input of the amplifier.

8. The waveform tracking clipper circuit of claim 1 wherein one or more of said first clamping means or second clamping means are substantially duplicated providing a redundant circuit to protect against component failure.

9. The waveform tracking clipper circuit of claim 8 wherein said splitter means and associated clamping means are duplicated and connected in parallel.

10. The waveform tracking clipper circuit of claim 9 wherein each of said splitter means includes an operational amplifier having a first input lead and a second input lead and
    a resistor connected in series with one of said first or second input leads.

11. The waveform tracking clipper circuit of claim 9 wherein at least one of said clamping means includes two or more diode connected in series.

12. The waveform tracking clipper circuit of claim 8 wherein said redundant circuit further includes a parrot source for generating a signal substantially identical to the unprocessed test signal and a synchronization circuit for synchronizing the signal generated by said parrot source with the unprocessed test signal.

13. The waveform tracking clipper circuit of claim 1 further including:
    a. a source for generating the unprocessed test signal connected to the unprocessed test signal;
    b. a processor connected to said source for processing the unprocessed test signal;
    c. an amplifier connected to said processor for amplifying the processed test signal; and
    d. a shaker connected to said amplifier for transforming the processed and amplified test signal into mechanical energy.

14. The waveform tracking clipper circuit of claim 1 further including phase means to compensate for phase shifts between the processed and unprocessed signals.

15. A solid state waveform tracking clipper circuit for limiting the instantaneous amplitude of processed complementary A and B vibration test signals at the complementary inputs to a push-pull amplifier, an unprocessed vibration test signal having been processed by a processor or pre-amplifier to develop the processed complementary vibration test signals, comprising:
    a. solid state simulator means connected to the unprocessed test signal for generating complementary A' and B' processed test signals in the absence of a malfunction or misadjustment in the processor or pre-amplifier;
    b. first tracker means connect to said A' signal for developing an output A' substantially equal to the portion of said A' signal which corresponds wit the active portion of the A signal;
    c. second tracker means connected to said B' signal for developing an output B' substantially equal to the portion of said B' signal which corresponds with the active portion of the B signal;
    d. first clamper means connected to said A' signal and to the A signal for clamping the A signal to said A' signal; and
    e. second clamper means connected to said B' signal and to the B signal for clamping the B signal to said B' signal.

16. The waveform tracking clipper circuit of claim 15 wherein each of said tracker means includes a precision rectifier and wherein each of said clamper means includes a diode.

17. The waveform tracking clipper circuit of claim 15 further including:

a. a source for generating the unprocessed test signal connected to the unprocessed test signal;
b. a processor connected to said source for processing the unprocessed test signal;
c. an amplifier connected to said processor for amplifying the processed test signal; and
d. a shaker connected to said amplifier for transforming the processed and amplified test signal into mechanical energy.

18. A solid state waveform tracking clipper circuit for preventing the instantaneous amplitude of a processed signal at the input to an amplifier from substantially exceeding the instantaneous amplitude of an unprocessed signal, the unprocessed signal having been processed to develop the processed signal, comprising:

a. limiting means connected between the processed signal and the input of the amplifier for limiting the processed signal at the input of the amplifier;
b. solid state splitter means having an input connected to the unprocessed signal and having a first and second output, the first output for tracking a first portion of the unprocessed signal, the second output for tracking a second portion of the unprocessed signal;
c. first clamping means connected to said first output and tot he input of the amplifier for clamping the input of the amplifier to the value of said first output; and
d. second clamping means connected to said second output and to the input of the amplifier for clamping the input to the amplifier to the value of said second output.

* * * * *